US005402093A

United States Patent [19]

Gibas et al.

[11] Patent Number: 5,402,093

[45] Date of Patent: Mar. 28, 1995

[54] ELECTROMAGNET HAVING AN ARMATURE WITH AN INJECTION-MOLDED GUIDE OR CONTROL ROD

[75] Inventors: Richard Gibas, Neunkirchen; Dieter Paul, Neunkirchen/Struthütten, both of Germany

[73] Assignee: Thomas Magnete GmbH, Herdorf, Germany

[21] Appl. No.: 69,528

[22] Filed: Jun. 1, 1993

[30] Foreign Application Priority Data

May 29, 1992 [DE] Germany ........................ 42 17 871.1

[51] Int. Cl.[6] ......................... H01F 3/00; F16K 31/02

[52] U.S. Cl. .................................. 335/261; 335/262; 335/255; 251/129.07; 251/129.15

[58] Field of Search ............... 335/261, 262, 263, 264, 335/251, 255, 279; 251/129.15, 129.07, 129.21; 604/65, 66, 67, 246; 128/DIG. 12

[56] References Cited

U.S. PATENT DOCUMENTS

| | | | |
|---|---|---|---|
| 2,727,715 | 12/1955 | Tuthill | 251/129.15 |
| 2,832,921 | 4/1958 | Horman . | |
| 3,851,285 | 11/1974 | Rothfuss | 335/261 |
| 3,969,044 | 7/1976 | Fussner | 417/410 |
| 4,967,786 | 11/1990 | DuHack | 137/329.04 |
| 5,002,835 | 3/1991 | Nijland et al. | 428/577 |
| 5,089,796 | 2/1992 | Glennon | 335/172 |

FOREIGN PATENT DOCUMENTS

| | | |
|---|---|---|
| 0231754 | 1/1987 | European Pat. Off. . |
| 0284634 | 3/1987 | European Pat. Off. . |
| 2233501 | 1/1991 | United Kingdom . |

*Primary Examiner*—Leo P. Picard
*Assistant Examiner*—Stephen T. Ryan
*Attorney, Agent, or Firm*—Herbert Dubno

[57] ABSTRACT

A rod or stem of an armature for an electromagnet is composed of a synthetic resin which can be molded directly in the armature, preferably with an annular flange forming an anti-adhesion ring.

11 Claims, 2 Drawing Sheets

FIG. 5
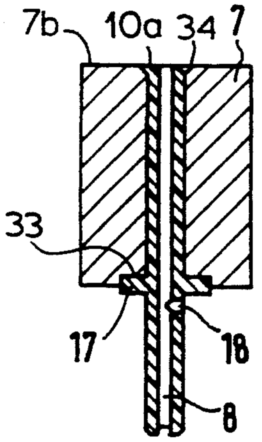
FIG. 6A
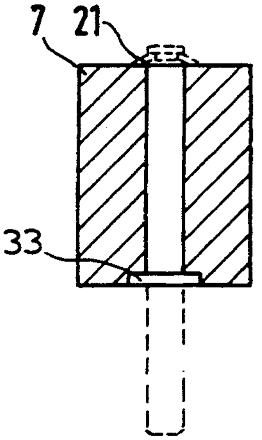
FIG. 6B
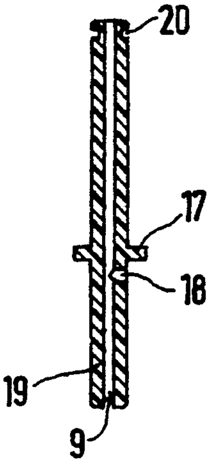
FIG. 7-PRIOR ART
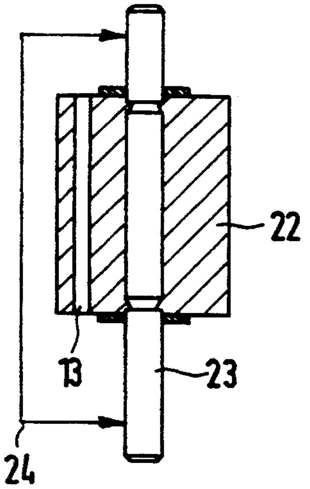
FIG. 8
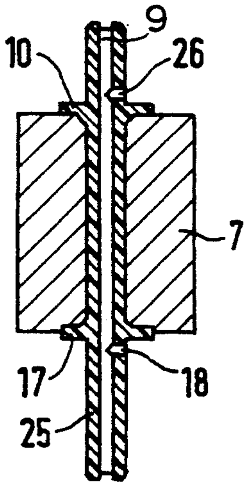
FIG. 9
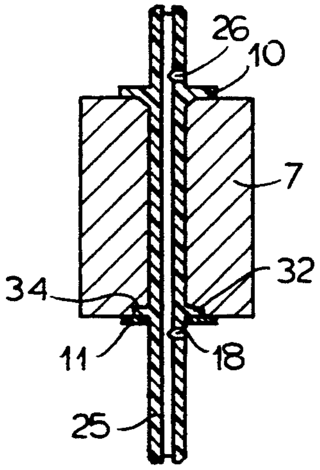
FIG. 10
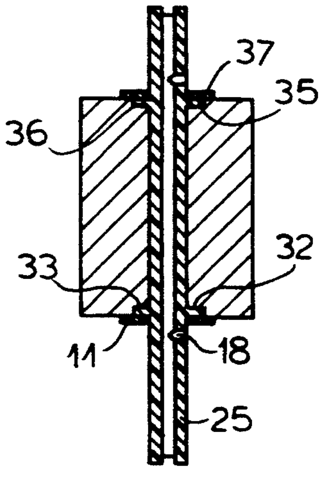
FIG. 11A
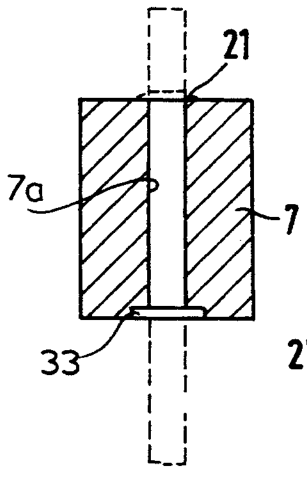
FIG. 11B
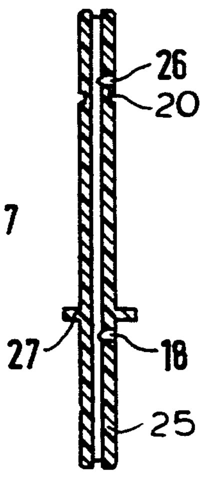

ELECTROMAGNET HAVING AN ARMATURE WITH AN INJECTION-MOLDED GUIDE OR CONTROL ROD

SPECIFICATION

1. Field of the Invention

The present invention relates to an electromagnet with at least one magnet coil in its housing and having an armature juxtaposed with the coil, provided with a central bore and receiving a rod which can be used for guiding, supporting or positioning the armature and/or for actuating or controlling some element such as a valve. More particularly, the invention relates to an armature for an electromagnet of the aforedescribed type in which the armature is provided with a rod received in a bore thereof.

2. Background of the Invention

Electromagnets or solenoids of the aforedescribed type are widely used for a great variety of purposes. The armature is either body-supported, i.e. guided at least at ends of the armature body, or rod-supported, i.e. guided with sleeves or plain slide bearings at ends of the rod or rods which extend axially and centrally from the opposite ends of the armature. It is also possible to guide one side of the armature with a sleeve or bushing in which the rod is engaged by the slide bearing while an opposite end of the armature is guided in a ring, bushing or sleeve surrounding the body of the armature.

In the past, the rods have been provided of metal which were formed with grooves enabling the armature to be bonded effectively to the rod by causing material of the armature to be pressed into these grooves. The armature can, for example, be composed of a solid ferromagnetic metal or a sintered or pressed-powder powder-metallurgical ferromagnetic product which is compressed radially to force material of the armature into these grooves.

This construction of the armature has been found to be expensive and disadvantageous since it frequently results in a off-center configuration, leading to many discards in the fabrication of the armature assembly or the need for machining the armature assembly after it has been formed, to make the armature assembly acceptable.

The close fit between the armature and the housing or parts of the magnet has also necessitated in the past the provision of grooves, passages or openings in the assembly to allow equalization of fluid pressure on opposite sides of the armature when the latter is set in motion. In substantially all cases, the housing contains a flowable medium, generally a liquid or a gas, which is displaced when the armature is actuated and, to prevent undesired retardation of the movement of the armature by the expressing of the fluid from the space to be occupied thereby, the flow of the fluid past the armature is generally mandatory.

When rod guidance of the armature is used, the armature can be formed with bores, passages or the like, opening on opposite sides of the guide bushings or sleeves to allow the pressure equalization and to avoid the formation of pressure cushions or the like which may impede the movement of the armature.

OBJECTS OF THE INVENTION

It is, therefore, the principal object of the present invention to provide an electromagnet whereby the drawbacks enumerated above can be avoided.

Another object of this invention is to simplify the manufacture and construction of an electromagnet and, especially, its armature assembly so that the costs of fabrication are reduced, the proportion of discards is minimized, and, in general, the electromagnet structure is improved over prior art systems.

SUMMARY OF THE INVENTION

These objects, and others which will be come more readily apparent hereinafter, are attained, in accordance with the invention by providing, in an electromagnet which has a housing for at least one magnet coil or solenoid coil, an armature juxtaposed with the coil and preferably axially shiftable therein, which is formed with an axial throughgoing central bore traversed by a rod in continuous contact with the wall of this bore over the entire length of the armature. Essential to the invention is that the rod is composed of a synthetic resin material (i.e. a plastic) and preferably an injection-moldable plastic.

More particularly, an electromagnet of the invention comprises:

a housing;

at least one magnet coil in the housing;

an armature juxtaposed with the coil and displaceable upon energization thereof, the armature being formed with a central throughgoing axial bore; and a rod composed of a synthetic resin received in the bore and in contact with the armature all along the bore and projecting from at least one end of the armature for guiding the armature or effecting a control function with the magnet.

The rod can be injection-molded directly in the armature and preferably an anti-adhesion retaining flange is injection-molded unitarily with the rod. This flange can overhang one end of the armature and can prevent the armature from adhering to the stator or yoke formed by the housing of the electromagnet.

Another flange can be formed unitarily with the rod at the opposite end of the armature so that the armature is engaged between the two flanges and can form a nonseparable assembly with the rod. Alternatively, one or both of the flanges can be a ring or washer which is applied to the rod.

This construction allows an easily and simply and inexpensively fabricated rod to be provided in the central bore of the armature and ensures, by the injection molding or a thermally-supported deformation of the rod the rod, to be accurately positioned centrally even for laterally-extending bores. Machining is not required and hence the number of discards is minimal.

The injection molding technique allows precisely dimensioned anti-adhesive disks, flanges or the like to be formed so that can serve to prevent continued magnetic adhesion between the armature and stator part when the electric current of the coil is turned off. Since the number of assembly and mounting steps is minimized, the number of discards resulting from poor handling during assembly is likewise reduced.

The injection molding of the rod directly in the armature ensures a reliable secure retention of the rod, exact central positioning thereof and simplified fabrication techniques to be used.

BRIEF DESCRIPTION OF THE DRAWING

The above and other objects, features and advantages of the invention will become more readily apparent from the following description, reference being made to the accompanying highly diagrammatic drawing in which:

FIG. 5 is an axial section through still another embodiment of an armature assembly according to the invention;

FIG. 6A is a section through yet another armature assembly showing the rod thereof in dot-dash lines;

FIG. 6B is a section through the rod for the assembly of FIG. 6A;

FIG. 7 is a sectional view of a prior art armature assembly for a rod-guided armature;

FIG. 8 is an axial cross sectional view for an armature assembly of the rod-guided type, in accordance with the present invention;

FIG. 9 is a cross sectional view of the latter variant representing still another embodiment;

FIG. 10 is a cross sectional view through yet a further embodiment of an armature assembly according to the invention;

FIG. 11A is a cross sectional view through an armature showing it rod in dot-dash lines; and FIG. 11B is a cross sectional view of the rod which is intended to be injection molded in place.

SPECIFIC DESCRIPTION

Figure 1:
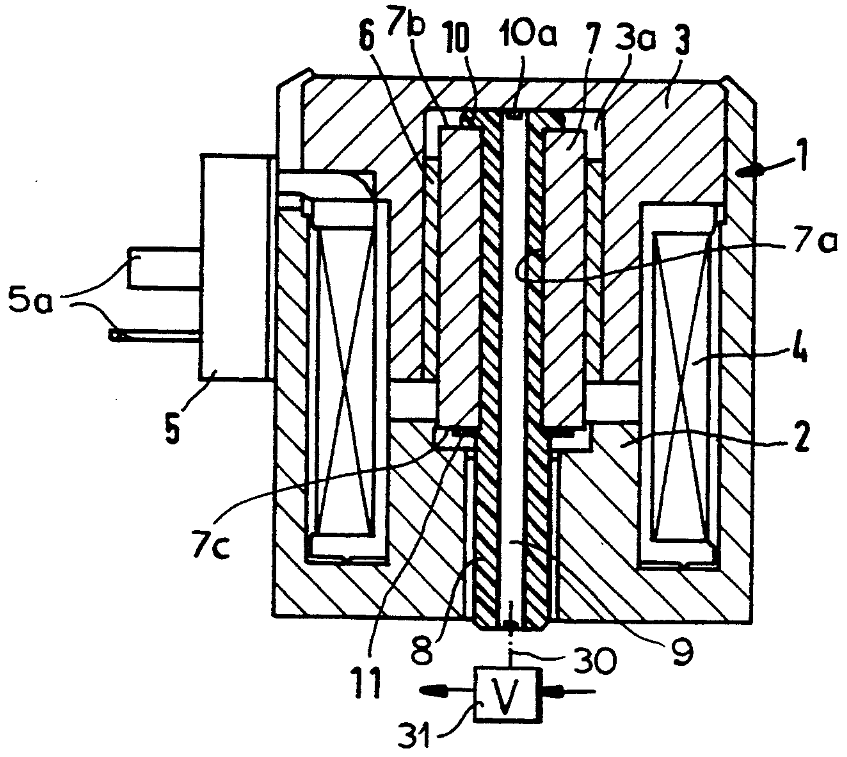
FIG. 1 is an axial cross sectional view through a magnetic valve embodying an electromagnet in accordance with the invention.

FIG. 1 shows a longitudinal section through an electromagnet or solenoid which has a housing 1 forming part of a stator. More particularly, the housing 1 is formed by one pole piece 2 and a second pole piece 3, the latter forming an upper member of a yoke for a magnet coil 4 which can be energized through a plug 5 mounted on the side of the housing 1 and having terminals 5*a* connectable to an electric current source.

The two pole pieces 2 and 3 form stops for an armature 7 which is body guided in a bushing or plain bearing 6, e.g. of bronze, received in the upper pole piece 3.

According to the invention, the rod 8 which traverses the axial bore 7*a* extending centrally through the armature 7 is a plastic member which is injection molded in the armature and is formed unitarily and with the same injection molding process, with a retaining flange 10 overhanging an end 7*b* of the armature to form an anti-adhesion disk which prevents the armature 7 from being mechanically retained against the pole piece 3 when the coil 4 is de-energized. The disk 10 is formed with a radial groove 10*a* enabling air or any other fluid in the space 3*a* of the pole piece 3 to escape when the armature moves upwardly. The radial groove 10*a* opens into an axial passage 9 which allows any compressible fluid in the space 3*a* to be vented to the exterior.

The passage 9 can be injection molded in the rod 8 which can be connected, as shown at 30 to the valve member 31 of the solenoid valve of which the electromagnet actuator has been shown in detail.

On the opposite end face 7*c* of the armature 7, an anti-adhesion washer 11 is provided which can be injection molded itself or on the armature 7 or on the rod 8 as a further flange thereof to prevent magnetic adhesion of the armature to the pole piece 2 when the armature 7 moves downwardly. The starting position of the armature has been shown in FIG. 1 and it can be assumed that it is biased into this position, e.g. by the valve spring.

When the magnetic coil 4 is energized, the armature 7 can be displaced downwardly whereby fluid can flow through the passage 9 into the space 3*a*. The equalization passage 9, 10*a*, therefore, prevents the formation of a pressure cushion which would limit the displaceability of the armature and the rod. The injection molding of a thermoplastic material to form the rod 8 and which hardens as it cools, simplifies the fabrication of the armature assembly, reduces the cost of manufacture and allows precise alignment of the armature and the rod. It also allows the anti-adhesion washer 11 to be formed simultaneously and the flange 10 to be formed, together with the notch groove 10*a* which permits fluid flow through the passage 9.

Figure 2:
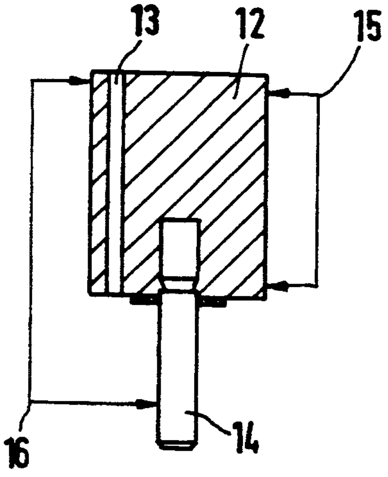
FIG. 2 is a diagrammatic cross sectional view of a prior art armature assembly.

As is schematically shown in FIG. 2, a conventional armature 12 can be formed with an equalization passage 13 in the body of the armature and can have a blind bore in which the metal rod 12 is received, the armature 12 being guided along its body as represented by the arrows 15 or the arrows 16 which show a joint body and rod guidance.

The material of the armature 12 is here pressed into a groove preformed in the rod 14.

Figure 3:
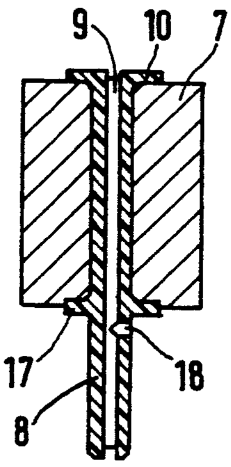
PRIOR ART FIG.3
FIG. 3 is an axial section through one embodiment of an armature assembly according to the invention.

FIG. 3 shows an armature assembly according to the invention. This assembly comprises the rod 8 which is injection molded into the armature 7 and is formed with the central equalization passage as well as retaining flanges 10 and 17, also injection molded concurrently on the rod.

The flanges 10 and 17 can be fabricated of such thickness that they function as anti-adhesion rings or washers.

In many cases, especially where the guidance of the armature is affected along the projecting portion of the rod 8, it has been found to be advantageous to provide a transverse bore 18 which opens into the equalization passage 9 and permits equalization of pressure on opposite sides of the armature 7 by displacement of the fluid which might otherwise form a cushion, even when the rod or stem 8 is engaged by a bushing below this bore.

Figure 4:
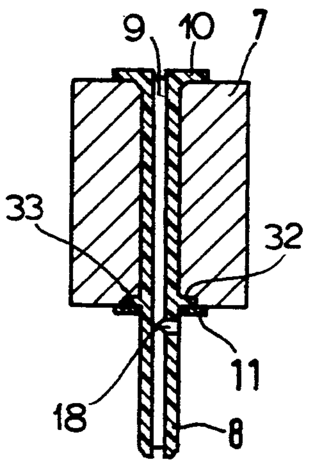
FIG. 4 is an axial section of a second embodiment of the armature assembly.

In the embodiment of FIG. 4, the retaining flange 10 is molded unitarily with the rod 8, but the anti-adhesion washer 11 is bonded to a small-diameter outwardly-extending flange 32 of the rod which can be received in a recess 33 at the lower end of the armature 7. A transverse bore 18 communicating with the passage 9 is provided here as well.

FIG. 5 shows a further embodiment wherein the upper flange 10*a*, unitarily molded on the rod 8, is a simple enlargement received in a recess 34 at the upper end 7*b* of the armature 7 while the lower flange 17 forms an anti-adhesion ring, is molded unitarily with the stem 8 from the thermoplastic material, and is received in a recess 33 of the armature 7. A transverse bore 18 is provided adjacent the flange 17 to communicate with the central passage. The flange 17 is only partly received in the recess 33.

While an injection-molded stem formed in situ within the armature is preferred, according to the invention, it is not mandatory and it is also possible to separately injection mold the stem as shown at 19 in FIG. 6B. In this case, the injection-molded stem is formed with the equalization passage 9, the flange 17 and the bore 18. It is also provided with a circumferential groove 20 in which a split ring or spring ring can be received as has been shown in dot-dash lines at 21 in FIG. 6A.

In this embodiment, the stem 19 is inserted into the armature 7 until its flange 17 is received in the recess 33, whereupon the locking washer 21 is applied. If desired, the free end of the stem projecting out of the armature 7 can be deformed or mushroomed to provide a rivet connection between the stem and the armature.

The invention also can be applied to armatures which are not body-guided, i.e. to armatures which can be stem or rod-guided.

In the prior art assembly as shown in FIG. 7, stem guidance was effected by bushings which engage a metal stem 23 as represented by the arrows 24. The armature 22 was pressed onto the stem or rod 23 and formed with the equalization bore 13 as previously described. By contrast, in stem-guided systems, the rod or stem 25 is injection molded in the armature 7 (FIG. 8), simultaneously formed with the flanges 10 and 17 as has previously been described, but provided with extensions to opposite sides of the armature 7. In this case, it is convenient to provide two bores 18 and 26 which communicate with the passage 9 and are located inwardly of the guide bushings.

While the flanges 10 and 17 can simultaneously form anti-adhesion rings at opposite ends of the armature 7, in FIG. 9, the anti-adhesion ring 11 can be shoved onto the stem 25 which can be formed with the small-diameter flange 32 in the recess 34 of the armature 7 while the flange 10 is formed at the opposite end. In FIG. 10, small-diameter flanges 32 and 35 are formed at opposite ends of the stem 25 to engage in recesses 33 and 36 respectively, formed in these ends, while the anti-adhesion means is formed by the washers 11 and 37 which are shoved axially over the stem.

FIGS. 11A and 11B show, respectively, an armature 7 provided with the bore 7*a* and a recess 33 into which a preformed stem 25 is inserted, this stem having an integrally molded flange 27 and a groove 20 into which a spring ring 21 can engage to anchor the rod to the armature. The invention is capable of other variations within the spirit and scope of the appended claims as well. What is important, of course, is that the rod or stem 8, 25 can be easily fabricated and can, for example, by being injection molded in the armature 7, be precisely centered with respect to the armature bore and the armature itself. The equalization passage is also readily formed in the stem or rod in this manner so that there is no need for additional passages in the armature or for any concern as to pressure equalization on opposite sides of the armature. The rod or stem is preferably made from an impact-resistant synthetic resin such as nylon (PA) although it can be made from polyphenyleneoxide (PPO) as well and by injection molding separately from the armature and later inserted. Mounting is simpler and less expensive than has been the case heretofore, especially where separate or special anti-adhesion disks are avoided.

Mounting defects are largely eliminated as well and, especially where anti-adhesion washers are not separately applied, can be forgotten entirely. The steps hitherto required for alignment of the rod and armature can be eliminated and the assembly can be fabricated with very close tolerances.

We claim:

1. An electromagnet, comprising:

a housing;

at least one magnet coil in said housing;

an armature juxtaposed with said coil and displaceable upon energization thereof, said armature being formed with a central axial bore extending completely through said armature between ends thereof; and a tubular rod composed of a synthetic resin received in said bore and in contact with said armature all along said bore and projecting from at least one end of said armature for guiding said armature or effecting a control function with said magnet, said rod being formed with a throughgoing passage opening at opposite ends thereof for equalizing pressure on opposite sides of, said armature, and transverse bores in said rod, communicating with said passage and located close to said armature.

2. The electromagnet defined in claim 1 wherein said rod is an injection-molded member in said armature.

3. The electromagnet defined in claim 2, further comprising an anti-adhesion retaining flange unitary with said rod.

4. The electromagnet defined in claim 1, further comprising at least one anti-adhesion disk of a synthetic resin material on said armature.

5. The electromagnet defined in claim 4 wherein said disk is applied to said rod as a separate washer.

6. The electromagnet defined in claim 4 wherein said disk is molded on said rod.

7. The electromagnet defined in claim 4 wherein said armature is engaged between annular formation on said rod.

8. The electromagnet defined in claim 7 wherein said formations, said rod and said armature form an inseparable assembly.

9. A solenoid, comprising:

a housing;

a cylindrical magnet coil in said housing having an axis, said housing having a cylindrical portion extending into said coil;

a cylindrical bushing received in said cylindrical portion and constituting a plain bearing; and an armature received in said plain bearing and axially guided thereby for movement in said housing upon energization of said coil, said armature comprising:

a cylindrical body of a ferromagnetic material having a central bore extending along said axis completely between ends of said body, a tubular rod received in said bore, composed of a synthetic resin material, having a passage extending axially through said rod between opposite ends thereof, and formed with extremities projecting from said cylindrical body at opposite ends of said cylindrical body, at least one of said extremities extending away from the respective end of said cylindrical body, and a flat disk-shaped shoulder formed unitarily with said rod and lying against a respective one of said ends of said cylindrical body to form an antiadhesion disk.

10. The solenoid defined in claim 9 wherein a respective flat disk-shaped shoulder is formed unitarily with said rod and lies against each of said ends of said cylindrical body to form a respective antiadhesion disk.

11. The solenoid defined in claim 9 wherein a groove is formed transversely through one of said extremities.

* * * * *